May 15, 1962 H. JAUN ET AL 3,035,195

STRUCTURAL MEMBER FOR CONDUCTING A MAGNETIC FLUX

Filed April 2, 1958 5 Sheets-Sheet 1

May 15, 1962 H. JAUN ETAL 3,035,195

STRUCTURAL MEMBER FOR CONDUCTING A MAGNETIC FLUX

Filed April 2, 1958

5 Sheets-Sheet 2

May 15, 1962 H. JAUN ETAL 3,035,195

STRUCTURAL MEMBER FOR CONDUCTING A MAGNETIC FLUX

Filed April 2, 1958 5 Sheets-Sheet 4

May 15, 1962 H. JAUN ETAL 3,035,195

STRUCTURAL MEMBER FOR CONDUCTING A MAGNETIC FLUX

Filed April 2, 1958 5 Sheets-Sheet 5

United States Patent Office 3,035,195
Patented May 15, 1962

3,035,195
STRUCTURAL MEMBER FOR CONDUCTING A MAGNETIC FLUX

Hermann Jaun, Regensdorf, Zurich, and Otto Welter, Orselina, Ticino, Switzerland, assignors to Elektro-Motoren A.G., Zug, Switzerland Filed Apr. 2, 1958, Ser. No. 726,011
Claims priority, application Switzerland Apr. 8, 1957
3 Claims. (Cl. 310—214)

The present invention relates to a structural member for conducting a magnetic flux, comprising at least one slot of preferably uniform section throughout its depth for the reception therein of at least one winding for the generation of a magnetic flux, so arranged that the direction of the flux on one side of the slot will be parallel or anti-parallel with the flux on the other side thereof. The said member may be the stator or rotor of an electric machine or of a part thereof, part of an electromagnetic relay, an adhesion or control magnet, or the like. The slot therefore separates teeth or poles. From the inception of electrical engineering electrical machines have been provided with polepieces made of iron of substantially the same cross section throughout their height.

To reduce loss due to the eddy currents induced in the iron and to improve efficiency it has already been proposed in such machines to construct the teeth from packets of laminated sheet or sintered material. For further improving the efficiency of electromagnetic machines, especially of axial air gap meters, it has been proposed to give the teeth a cross section that widens radially outwards. However, this entails the major disadvantage that the electric conductors cannot be inserted into the slots in the form of dimensionally accurate parcels and that they must be placed into the narrow slots individually, a process which not only increases the cost but which is also open to the objection that the space factor in unfavourably affected and that the conductors can easily be damaged. In axial air gap motors with teeth that have the same cross section throughout their height it has therefore been proposed to cover all the teeth with a thin metal sheet, as described in the U.S.A. appl. Ser. No. 163,579. However, when the apparatus in question is of greater size the advantage of this form of construction is offset by the rapidly increasing losses.

The structural member proposed by the present invention is characterised in that each tooth or pole is widened by a slot bridging member consisting at least partly of iron and held in grooves in the two slot walls at such a depth inside the slot that the slot bridging members will not project beyond the upper edge of the slot. It will be clearly understood that the proposed arrangement does not relate to slot covers consisting of insulating or non-ferromagnetic material which serve to retain the conductors inside the slot, nor to the large, known type of iron wedges which serve as slot covers in D.C. machines, but that they are elements which represent an extension of the free ends of adjacent poles or teeth and that by influencing the magnetic flux they modify the characteristics of the electric apparatus in question.

A number of illustrative embodiments of the invention will now be described with reference to the accompanying drawings in which FIG. 1 is a sectional representation of a number of open slots in an induction motor;

Figures 1, 2:
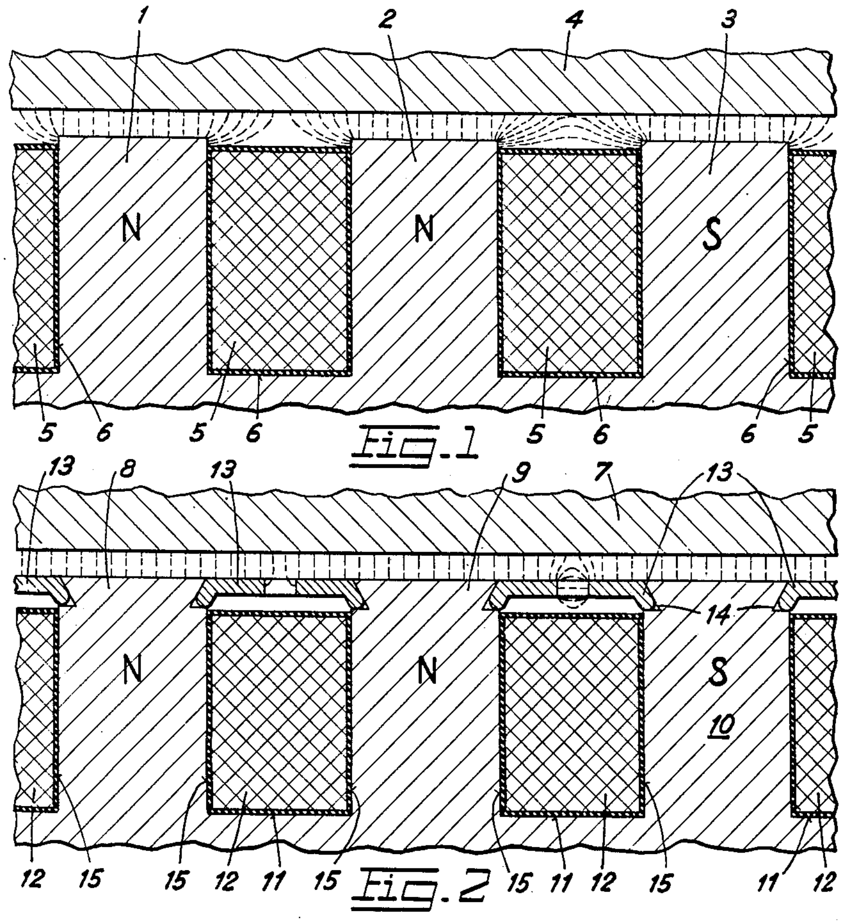
FIG. 2 is a similar section relating to a motor constructed according to the invention.
Figure 3:
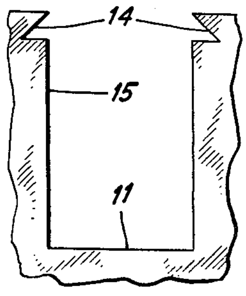
FIGS. 3 to 8 are six alternative forms of construction of grooves for retaining the slot bridging members.
Figure 4:
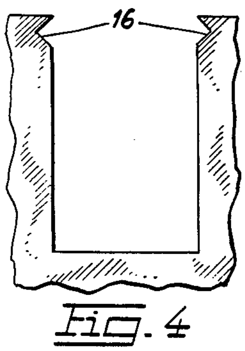
Figure 5:
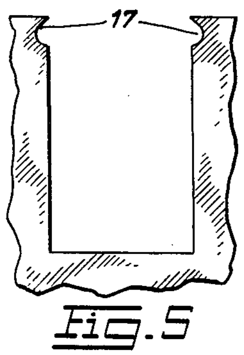
Figure 6:
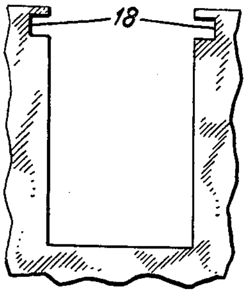
Figure 7:
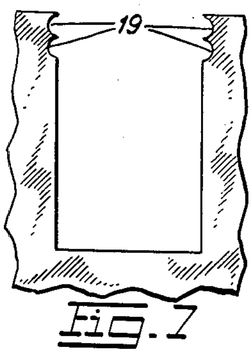
Figure 8:
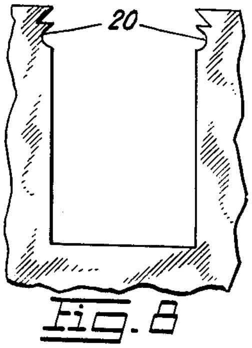

FIG. 1 is an axial section of three adjacent teeth and of the slots in an induction motor of conventional design. The rotor 4 faces the poles 1, 2 and 3 which have a uniform section throughout their height. The conductors in the slots 6 between the poles are inidcated by 5. The magnetic flux between the free ends of the teeth (of which two are N-poles whereas one is an S-pole) and the rotor is, as shown in the drawing, very regular in the region of the teeth 1, 2 and 3, but extremely irregular in the region of the slots 6. In a rotor provided with slot bridging members of the kind proposed by the present invention the picture is very much different. FIG. 2 is a section that corresponds with that shown in FIG. 1, two N-poles 8 and 9 and one S-pole 10 again facing the rotor 7. The conductors 12 are accommodated inside the slots 11 between the poles. In this instance the free ends of adjacent teeth are connected by a slot bridging member 13 which here consists of soft iron with its outside surface extending flush with the faces of the free ends of the poles. In other words the slot bridging members are countersunk into the slots. It will be immediately seen that the magnetic field is very much more regular, a fact which materially improves the motor characteristic. The slot bridging members 13 are held in V-type grooves 14 machined into the upper ends of the side walls 15 of the slots 11. The shape of these grooves can be modified in many ways. FIG. 3 shows an example in which the pitch of the V of the grooves 14 differs from that in FIG. 2, and FIGS. 4 to 8 illustrate other possible shapes of grooves for retaining and holding the slot bridging members in position. Whereas the grooves 14 shown in FIG. 3 are V's with an acute apex angle, the angle at the apex of the V 16 in FIG. 4 is approximately 90°. Moreover the groove 17 in FIG. 5 is of semicircular cross section. whereas in FIG. 6 the groove 18 has a rectangular section. In FIGS. 7 and 8 twin grooves are provided of which groove 17 in FIG. 7 comprises two semi-circular sections, whereas groove 20 in FIG. 8 comprises one semi-circular and one V-section. It will be readily understood that a multitude of alternate shapes can be contrived within the scope of the present invention, such as for instance those illustrated in FIGS. 10 and 26.

Figure 11:
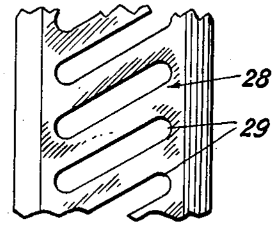
FIG. 11–18 are plan views of five different forms of construction of slot bridging members which in effect represent multiple link mechanical chains.
Figure 12:
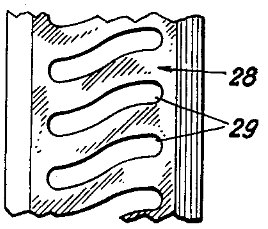
Figure 13:
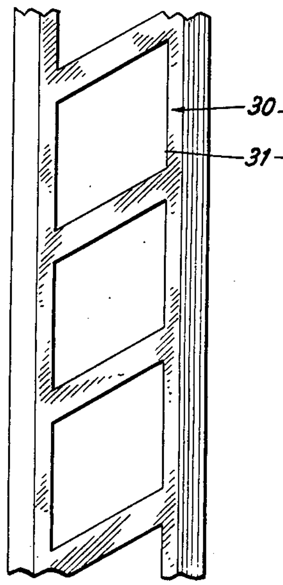
Figure 14:
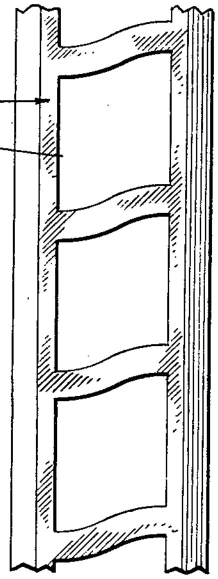
Figure 19:
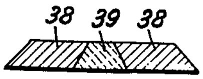
FIGS. 19–24 are sections of six different forms of construction of slot bridging members suitable for use in electrical machinery.
Figure 20:
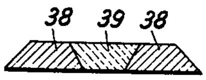
Figure 21:
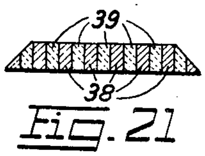
Figure 22:
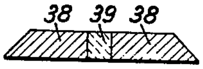
Figure 23:
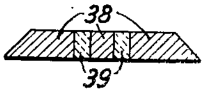
Figure 24:
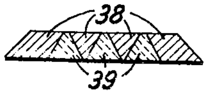
Figure 9:
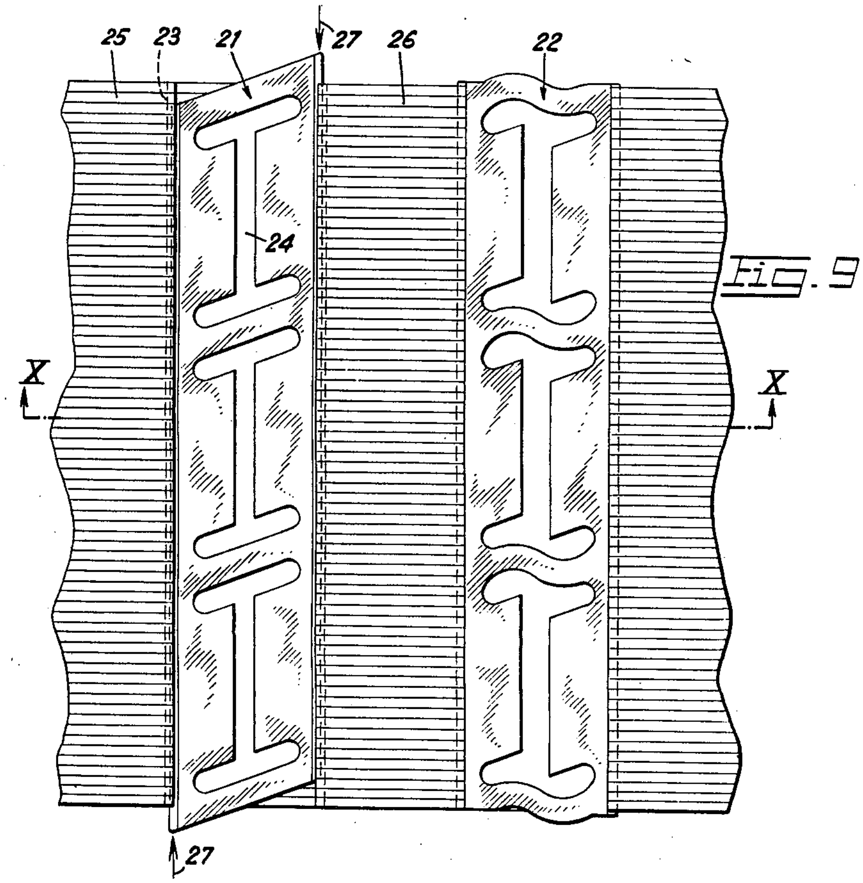
FIG. 9 is a plan view of two slot bridging members of which one is secured in position.
Figure 10:
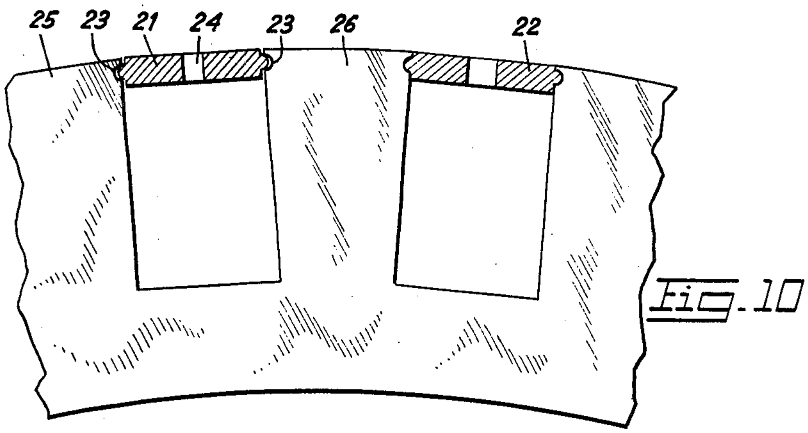
FIG. 10 is a section taken on the line X—X in FIG. 9.
Figure 15:
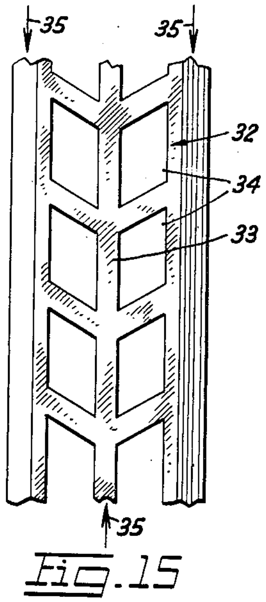
Figures 16, 17:
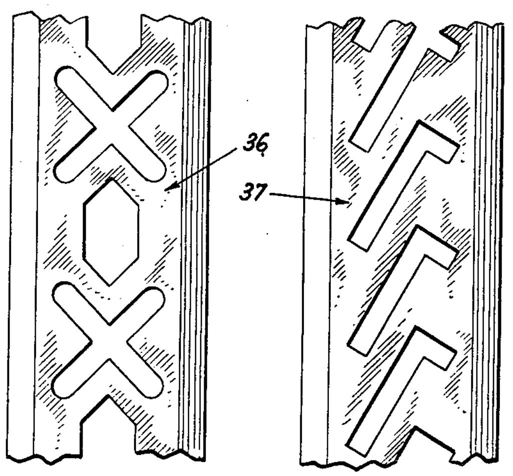
Figure 18:
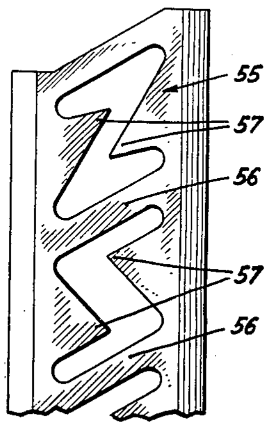

FIGS. 9 and 10 illustrate the manner in which a slot bridging member (of course after the conductors, not shown in the drawing, have been placed in position in the slot) can be secured in place in a simple way. Of the two slot bridging members 21 and 22 shown in plan in FIG. 9 the first has merely been pushed into position in the two grooves 23. It consists entirely of soft iron and, midway between the two teeth 25 and 26, it has several H-shaped openings 24, preferably wider in the center between the teeth than the width of the air gap, if the teeth are of opposite polarity, i.e. than the distance between the free face of the tooth and the opposite face of the rotor which is not shown in the drawing. When the slot bridging member has been pushed into position, pressure is applied to the parallelogram-shaped member in the direction indicated by the two arrows 27. The member is thereby deformed into a rectangular shape and tightly wedges itself in the grooves. The compressional deformation of the bridging member fixes it permanently in position and at the same time stabilises the magnetic iron mass so that the generation of vibrations and noise is suppressed. FIGS. 11–18 are plan views of other possible forms of construction of slot bridging members of a kind that can be secured by deformational wedging. More particularly FIGS. 11 and 12 represent a portion of the same member 28 with oblique slots 29 before and after it has been deformed, whereas FIGS. 13 and 14 show a bridging member 30 with approximately rhomboid openings 31 before and after deformation. The slot bridging member 32 illustrated in FIG. 15 has a central web 33 between the two adjacent teeth, and on either side of the web are several openings 34. The manner in which the deformational pressure should be applied is indicated by arrows 35. Two further slot bridging members 36 and 37 with differently shaped openings are shown in FIGS. 16 and 17 respectively. FIG. 18 illustrates a slot bridging member 55 with web members 56 which connect the neighbouring teeth, and with triangular portions 57 which by giving the slots a sagittate outline reduce the generation of higher harmonics.

All the openings that have been illustrated and described serve to avoid the creation of a complete magnetic short circuit between adjacent magnetic poles. The size of the small webs or bridges which connect the poles or teeth must be such that their magnetic reluctance is sufficient to impart a sensible characteristic to the electrical apparatus in question (which may be an electric machine, a transformer, or a relay or magnet). By making use of appropriate slot bridging members the characteristics of such apparatus can therefore be varied within certain limits. In the case of motors and generators the slot bridging members proposed by the invention permit natural vibrations and noise to be suppressed.

To obtain a certain amount of magnetic insulation between adjacent poles the openings in the covers can be replaced by insertions consisting of non-ferromagnetic materials, as illustrated in FIGS. 19 to 24 which represent cross sections of slot bridging members consisting of two or more soft iron elements 38 with interposed insertions consisting of some other material 39. The cross sections as drawn may extend along the entire length of each bridge, although it is of course quite possible to provide such bridging members with openings as well.

One feasible method of constructing slot bridging members of the latter type is to build them up of several wedge-shaped members extending lengthwise of the slot, the several members being fitted together when the cover is inserted into position.

As has been mentioned the several poles of an electrical machine do not as a rule consist of homogeneous pieces of soft iron. They are rather composed of laminations or sintered material to reduce the iron losses due to the generation of eddy currents. By fitting slot bridging members consisting purely of metal the eddy current losses which are reduced by the above mentioned special devices would again increase, since a single bridging member might conceivably short-circuit all the laminations in a packet. It is therefore generally necessary to provide the slot bridging members, at least where they make contact with the poles, with a nonconducting coating. This may be produced, for instance, by phosphating or oxidizing the bridges or by the cataphoretic deposition of an insulating film.

Figure 25:
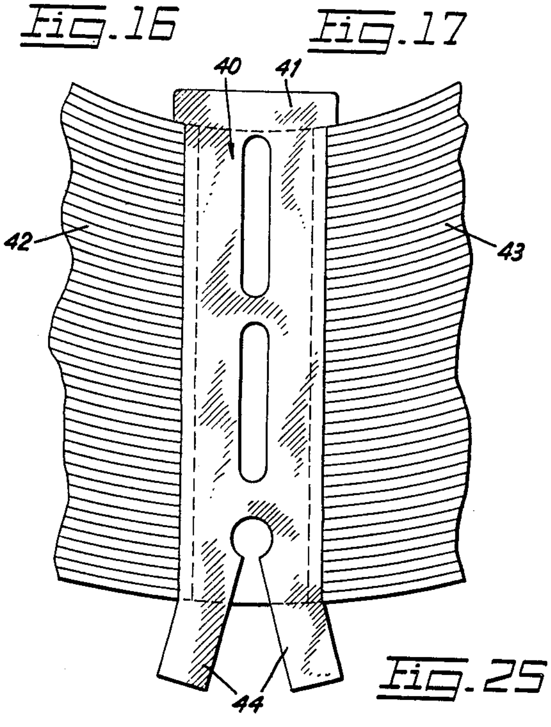
FIG. 25 is a plan view of a slot bridging member which at the same time serves for holding together a laminated packet.
Figure 26:
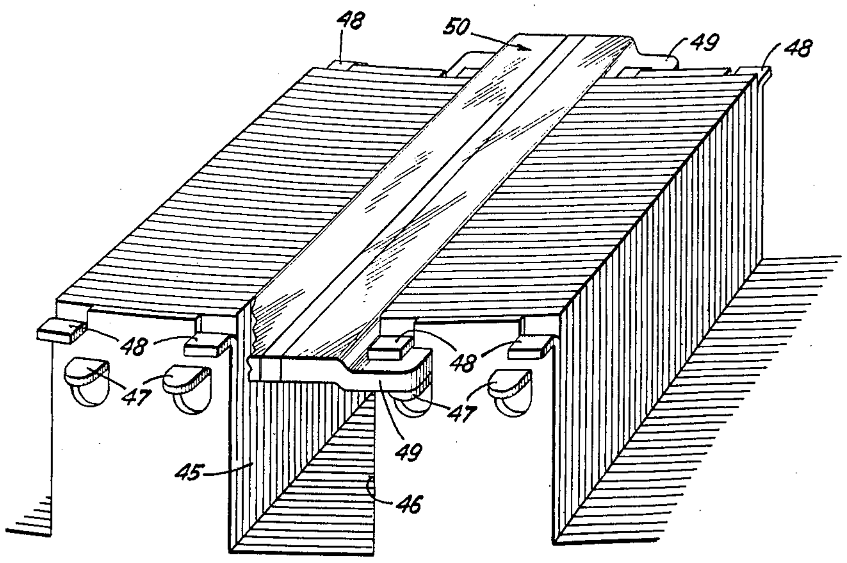
FIGS. 26 and 27 are perspective views of parts of an electrical machine with laminated poles held together by the slot bridging members.
Figure 27:
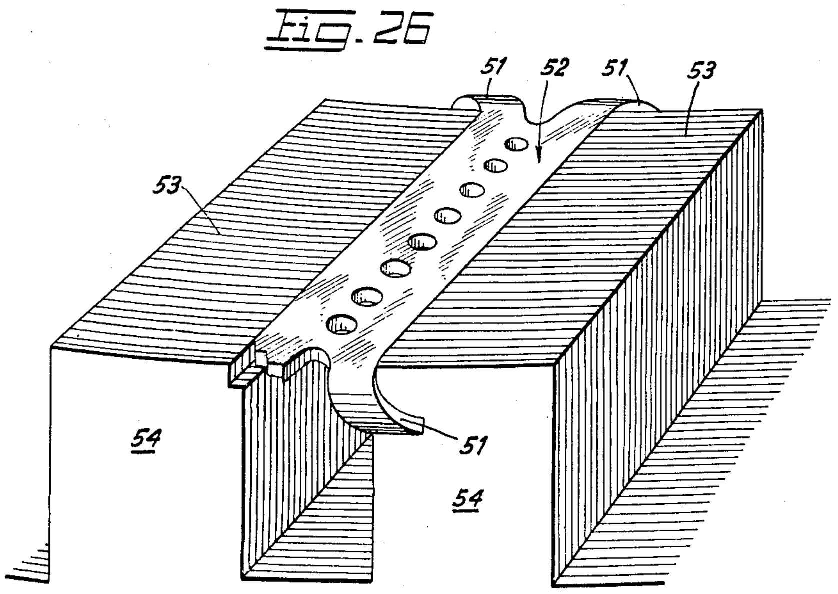

FIGS. 25 to 27 show three embodiments of slot bridging members for electrical machines with laminated poles, in which the slot bridging members are incidentally used to hold the packets together.

The width of the slot bridging member 40 shown in FIG. 25, at its radially inward end 41, is greater than the distance between the neighbouring poles 42 and 43. The radially outward end 44 of the slot bridging member 40 is splayed so that the bridging member is tightly wedged and also holds the packet of laminations by its clamping effect. In the embodiment illustrated in FIG. 26 the side walls 45 and 46 of the slots have no retaining grooves. Instead a number of lugs 47 and 48 are formed by sections bent out of the outside lamination of the packet, those marked 48 serving to retain the widened ends 49 of the bridging member 50, which at the same time rests on the other lug 47, whereas the far ends 49 on their part hold the laminated packets together.

FIG. 27 discloses a simpler form of construction in which the splayed ends 51 of the slot bridging members 52 are bent downwards, i.e. away from the faces 53 of the poles 54. It will be at once understood that the several described shapes and methods of fixing the slot bridging members can be combined in different ways and that any further number of embodiments could be devised within the scope of the invention.

What is claimed is:

1. In a method of installing a slot closure wedge in a slot of predetermined length and width for retaining conductor windings therein, said wedge having two elongated longitudinal members in substantially parallel spaced alignment and a plurality of elongated transverse members, each having two opposite end portions fixedly fastened to said longitudinal members, respectively, at least a portion of each of said transverse members intermediate said end portions thereof being obliquely inclined in the same direction relative to the direction of elongation of said longitudinal members and being made of plastically deformable material, the steps of inserting said wedge in said slot, said wedge having an initial width smaller than said predetermined width of said slot; and exerting opposite longitudinal forces to said two longitudinal members of the wedge respectively so as to plastically deform said obliquely inclined portions of said transverse members and to increase the width of said wedge until said longitudinal members wedgingly engage the walls of said slot.

2. In a method of installing a slot closure wedge in a slot of predetermined length and width for retaining conductor windings therein, said wedge having two elongated longitudinal members in substantially parallel spaced alignment and a plurality of elongated transverse members, each having two opposite end portions fixedly fastened to said longitudinal members, respectively, at least a portion of each of said transverse members intermediate said end portions thereof being obliquely inclined in the same direction relative to the direction of elongation of said longitudinal members, the steps of inserting said wedge in said slot, said wedge having an initial width smaller than said predetermined width of said slot and being made of soft iron; and exerting opposite longitudinal forces to said two longitudinal members of the wedge respectively so as to plastically deform said obliquely inclined portions of said transverse members and to increase the width of said wedge until said longitudinal members wedgingly engage the walls of said slot.

3. In a method of installing a slot closure wedge in a slot of predetermined length and width for retaining conductor windings therein, said wedge having two elongated longitudinal members in substantially parallel spaced alignment and a plurality of elongated transverse members, each having two opposite end portions fixedly fastened to said longitudinal members, respectively, at least a portion of each of said transverse members intermediate said end portions thereof being obliquely inclined in the same direction relative to the direction of elongation of said longitudinal members, the steps of inserting said wedge in said slot, said wedge having an initial width smaller than said predetermined width of said slot and at least said obliquely inclined portions being made of soft iron; and exerting opposite longitudinal forces to said two longitudinal members of the wedge respectively so as to plastically deform said obliquely inclined portions of said transverse members and to increase the width of said wedge until said longitudinal members wedgingly engage the walls of said slot.

References Cited in the file of this patent

UNITED STATES PATENTS

| | | |
|---|---|---|
| 888,456 | Barr | May 26, 1908 |
| 911,018 | Lamme | Jan. 26, 1909 |
| 941,182 | Young | Nov. 23, 1909 |
| 980,286 | Kennedy et al. | Jan. 3, 1911 |
| 1,260,674 | Jackson | Mar. 26, 1918 |
| 1,311,466 | Sandfield | July 29, 1919 |
| 1,563,110 | Regelein | Nov. 24, 1925 |
| 2,386,673 | Fisher | Oct. 9, 1945 |
| 2,710,931 | Tittel et al. | June 14, 1955 |

FOREIGN PATENTS

| | | |
|---|---|---|
| 626,439 | Great Britain | July 14, 1949 |